United States Patent
Rösel et al.

(10) Patent No.: US 8,220,316 B2
(45) Date of Patent: Jul. 17, 2012

(54) METHOD FOR DETERMINING AN ALCOHOL CONCENTRATION OF FUEL FED TO COMBUSTION IN A MOTOR VEHICLE AFTER FILLING WITH A FUEL OF PREDETERMINED ALCOHOL CONCENTRATION

(75) Inventors: Gerd Rösel, Regensburg (DE); Harry Schüle, Neunburg V. Wald (DE)

(73) Assignee: Continental Automotive GmbH, Hannover (DE)

( * ) Notice: Subject to any disclaimer, the term of this patent is extended or adjusted under 35 U.S.C. 154(b) by 546 days.

(21) Appl. No.: 12/306,908

(22) PCT Filed: May 14, 2007

(86) PCT No.: PCT/EP2007/054646
§ 371 (c)(1),
(2), (4) Date: Dec. 29, 2008

(87) PCT Pub. No.: WO2008/000550
PCT Pub. Date: Jan. 3, 2008

(65) Prior Publication Data
US 2010/0126253 A1    May 27, 2010

(30) Foreign Application Priority Data
Jun. 29, 2006  (DE) .................. 10 2006 029 970

(51) Int. Cl.
*G01N 33/20* (2006.01)
(52) U.S. Cl. ..................................... 73/61.43
(58) Field of Classification Search .................. None
See application file for complete search history.

(56) References Cited

U.S. PATENT DOCUMENTS

| | | | |
|---|---|---|---|
| 5,850,824 A | 12/1998 | Seitz et al. | 123/688 |
| 6,257,174 B1 | 7/2001 | Huff et al. | 123/1 A |
| 6,758,201 B2 * | 7/2004 | Hosoi | 123/679 |
| 2007/0129878 A1 * | 6/2007 | Pepper | 701/123 |

FOREIGN PATENT DOCUMENTS
EP    1304466    10/2002

OTHER PUBLICATIONS

International Search Report and Written Opinion; PCT/EP2007/054646; pp. 9, Jul. 30, 2007.

* cited by examiner

*Primary Examiner* — Hezron E Williams
*Assistant Examiner* — Alex Devito
(74) *Attorney, Agent, or Firm* — King & Spalding L.L.P.

(57) ABSTRACT

In the method for determining the alcohol concentration of the tank fuel after filling up with E85 fuel or E0 fuel, two corridors of possible lambda values for filling with E0 fuel and E85 are established according to the volumes of the tank fuel before and after filling, and the lambda values are taken into account in the evaluation.

15 Claims, 1 Drawing Sheet

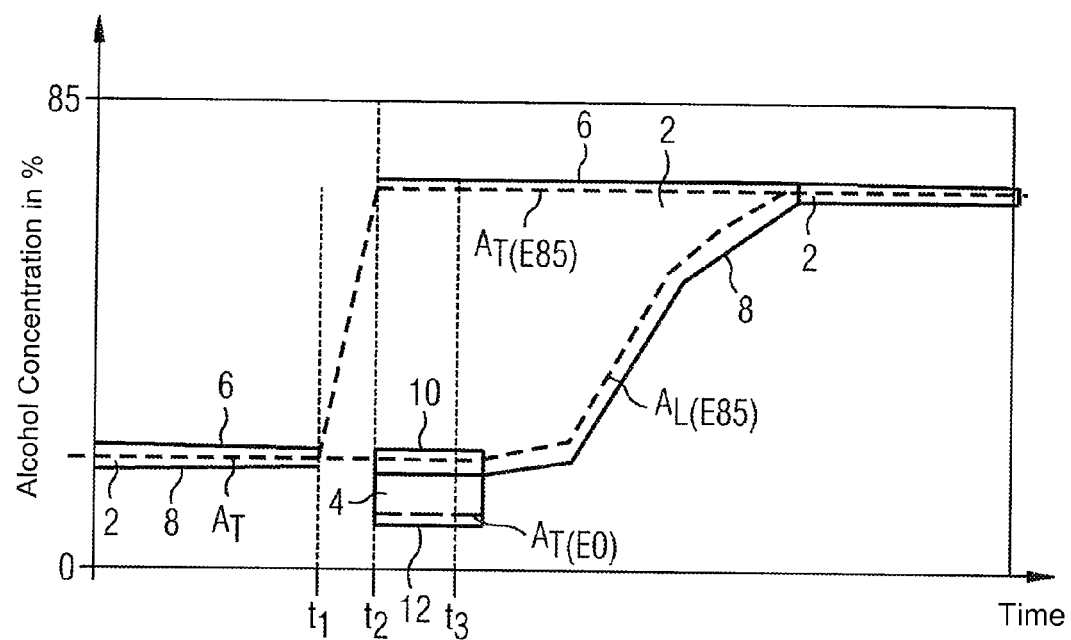

METHOD FOR DETERMINING AN ALCOHOL CONCENTRATION OF FUEL FED TO COMBUSTION IN A MOTOR VEHICLE AFTER FILLING WITH A FUEL OF PREDETERMINED ALCOHOL CONCENTRATION

CROSS-REFERENCE TO RELATED APPLICATIONS

This application is a U.S. National Stage Application of International Application No. PCT/EP2007/054646 filed May 14, 2007, which designates the United States of America, and claims priority to German Application No. 10 2006 029 970.1 filed Jun. 29, 2006, the contents of which are hereby incorporated by reference in their entirety.

TECHNICAL FIELD

The present invention relates to a method for determining the alcohol concentration of fuel that can be fed to combustion in a motor vehicle after filling.

BACKGROUND

In coming years, the proportion of motor vehicles, which are operated with alcohol, will go up increasingly. In this way, alcohol, e.g. ethanol may be present in fuel in different concentrations of between 0 and 100%. Such fuels are also referred to as "FlexFuel" or "Flexible Fuel" (FF).

The basic operation of motor vehicles with alcohol was already proven a long time ago and many vehicles are provided with alcohol for operation particularly in South America and North America. The concentration of alcohol in the tank fuel may vary from one tank filling to another tank filling depending on the filled fuel. Any concentrations of alcohol in the fuel may result in this way. For a faultless operation of the combustion engine, it is necessary for the operating control device of the combustion engine to identify the new fuel composition as soon as possible and to take this into account in its control strategies.

In the document U.S. Pat. No. 6,257,174 B1, a method is described in which the alcohol concentration of the new fuel mixture is estimated by way of the ratios of the volumes of the fill level quantities before and after filling as well as the fact that only pure gasoline or flex-fuel of an alcohol concentration of 85% could have been filled. This means that when pure gasoline is filled, the alcohol concentration will drop and when E85 fuel is filled, the alcohol concentration will remain the same or increase. The previously known method takes advantage of the fact that the lambda value (air/fuel ratio) measured by the lambda sensor changes if the alcohol concentration of the fuel fed to the combustion changes. With the previously known method, based on the fuel located in the tank, an upper and a lower threshold are thus predetermined for the lambda value, so that if the respective threshold is exceeded or not reached, the filled fuel type can be indicated. The engine timing is then operated taking the new alcohol concentration of the fuel into account.

With this method, there is however the problem that the new fuel mixture is not instantly available at the injection point immediately after filling, because "old" fuel with the previous alcohol concentration is generally located in the fuel supply line and in the fuel filter. This also results in the "new" and "old" fuel mixing, with it being possible for this mixture initially to be different to the mixture of the fuel in the tank as a result of different volume ratios. For this reason, "change-over mixture ratios" exist as long as the new fuel has displaced the old fuel completely.

As already mentioned, it is extremely important to determine the fuel mixture as soon as possible after filling because certain system diagnoses like for instance the diagnosis of the fuel system prescribed by the lawmaker are dependent on admissible lambda values.

When determining the alcohol concentration of the tank fuel after filling, account must also be taken of the measured lambda values not only being changeable as a result of the alcohol proportion but instead also as a result of components in the fuel system ageing. For instance, the flow rates of the injection valves may change throughout the service life. It is already known in the prior art that the operating control device of the combustion engine takes corresponding ageing effects into account by means of adaptation methods, with deviations in the lambda values of for instance ±25% from the standard values being allowed.

During operation of the combustion engine with fuel of different alcohol concentrations, there is however the problem that the operating control device can no longer determine whether changes in the lambda value were caused by components aging or by changes in the alcohol concentration.

SUMMARY

According to various embodiments the described disadvantages can be prevented or at least reduced. According to various embodiments a method for determining the alcohol concentration of fuel can be specified that can be fed to combustion in a motor vehicle after filling with either a first fuel type or a predetermined alcohol concentration of a second fuel type of another alcohol concentration, in which the new fuel mixture produced during filling can be taken into account as quickly and as accurately as possible after filling.

According to an embodiment, in a method for determining the alcohol concentration of fuel that can be fed to combustion in a motor vehicle after filling with either a first fuel type of a predetermined alcohol concentration or a second fuel type of another alcohol concentration, with the respectively filled fuel type being indicated from changes to the lambda value measured by a lambda sensor, in order to be able to determine the alcohol concentration of the tank fuel after filling as a function of the alcohol concentration of the filled fuel type, the alcohol concentration of the tank fuel before filling and the volumes of the tank fuel before and after filling, that the method comprising the step of establishing a first corridor of possible lambda values for the filling with the first fuel type which is limited by an upper and lower threshold and a second corridor of possible lambda values for the filling with the second fuel type which is limited by an upper and lower threshold for the time after filling as a function of the volumes of the tank fuel before and after filling and the measured lambda values are taken into account in the evaluation.

According to a further embodiment, the upper and lower threshold of each corridor can be adapted as a function of the time and the fuel consumption such that the initially large width of each corridor becomes increasingly smaller. According to a further embodiment, only one of the two corridors may be taken into account during the evaluation of the lambda values, once changes to the measured lambda value can identify the fuel type with which the motor vehicle was filled. According to a further embodiment, an error in the fuel system may be identified if the measured lambda values do not lie in at least one of the corridors. According to a further embodiment, system diagnoses, which use the measured lambda values as input variables, may be operated if the measured lambda values lie within at least one of the corridors. According to a further embodiment, as a result of components in the fuel system ageing, certain changes to the lambda values may be established and taken into account during the determination of the alcohol concentration in the tank fuel. According to a further embodiment, ageing components in the fuel system may allow specific changes to the lambda values to be calculated with the aid of the equation $$\Delta_{Lam} = \Delta_{BT} + \Delta_A$$

for an operating point before and an operating point after the filling, in which equation $\Delta_{Lam}$ is the difference between a measured lambda value and the lambda value for fuel of an alcohol concentration of 0% and $\Delta_{BT}$ and $\Delta_A$ are the ageing and alcohol-specific proportions of the said difference. According to a further embodiment, the determined ageing-specific changes to the lambda values can be taken into account when determining the thresholds of the corridors. According to a further embodiment, the first fuel type can be a fuel of an alcohol concentration of 85% and the second fuel type is a fuel of an alcohol concentration of 0%.

BRIEF DESCRIPTION OF THE DRAWINGS

On the basis of the diagram shown in the single FIGURE, in which the alcohol concentration and/or Lambda is plotted over time, an exemplary embodiment of the method is described in more detail.

DETAILED DESCRIPTION

With the method according to according to various embodiments, a first corridor of possible lambda values for filling, with the first fuel type and a second corridor of possible lambda values for filling with the second fuel type are established for the time after filling as a function of the volumes of the tank fuel before and after filling and the measured lambda values are taken into account in the evaluation.

The thresholds of each corridor are expediently adapted as a function of the time and of the fuel consumption such that an initially large width of each corridor becomes increasingly smaller. As soon as changes to the measured lambda values can identify the fuel type with which the motor vehicle was filled, one of the two corridors can be excluded so that allowance need only be made for the other corridors.

No lambda values can appear outside the corridors during normal operation of the combustion engine. If measured lambda values do not lie within at least one of the corridors however, an error is identified in the fuel system.

The method according to various embodiments has the important advantage that "plausibilized" lambda values exist very quickly after filling. System diagnoses like for instance a diagnosis of the fuel system, with which the measured lambda values are used as input parameters, can then always be operated when the measured lambda values lie within at least one of the corridors. They can thus also be put into operation immediately after filling.

In a further embodiment, provision is made for specific changes to the lambda values to be established as a result of the changing components in the fuel system and to be taken into account during the determination of the alcohol concentration in the tank fuel.

The determination of ageing-specific changes to the lambda value allows the thresholds of the corridors to be established more precisely and allows the alcohol concentration of the tank fuel to be able to be determined with higher precision after filling.

The two fuel types are preferably an E0 fuel (alcohol concentration of 0%) and an E85 fuel (alcohol concentration of 85%). It nevertheless shall be understood that the method according to various embodiments can also be used in fuel types of different alcohol concentrations.

As mentioned in the introduction, the method according to various embodiments is used to determine the alcohol concentration of fuel that can be fed to combustion in a motor vehicle after filling with an alcohol concentration which differs from two possible fuel types, with the one fuel type being E0 fuel and the other fuel type being E85 fuel in the illustrated exemplary embodiment.

In the diagram in the FIGURE, the alcohol concentration of the fuel that can be fed to combustion is shown over time, indeed before and after a filling process. The "fuel which can be fed to combustion" is the fuel which is present in the tank and the fuel supply lines, the fuel filter etc. and is available at injection valves. This fuel is abbreviated to "tank fuel" in the description and claims.

Instead of the alcohol concentration, the lambda value measured by a lambda sensor (not shown) can also be plotted over time, with a similar diagram then being produced.

The filling process takes place at time instant $t_1$. The alcohol concentration of the tank fuel prior to the filling process is approximately known from the preceding filling process and from the following "learning process" to be described below. It is indicated by the dashed line $A_T$ prior to time instant $t_1$.

At time instant $t_1$, the motor vehicle is either filled with E85 fuel or E0 fuel. The used fuel type is initially not known to the operating control device (not shown). With the aid of conventionally used fuel level sensors in the tank (not shown), the volumes of the tank fuel can however be determined before and after filling. If the operating control device has then identified the filled fuel type, it is possible to determine the new alcohol concentration of the tank fuel from this data, provided that the "old" and "new" fuel have mixed completely.

Immediately after the filling process at time instant $t_1$, this is however generally not the case. Old fuel of an alcohol concentration as was present prior to filling is normally present in the fuel supply lines and in the fuel filter. This is indicated by the dashed line $A_{L(E85)}$.

In the diagram, $t_2$ is the time instant at which the combustion engine is started after filling and $t_3$ is the time instant at which the lambda controller provided in the operating control device is active.

It is assumed that the motor vehicle was filled with E85. The alcohol concentration of the fuel fed to the injection valves will then approximately follow the dashed line $A_{L(E85)}$ during normal operation. This means that the alcohol concentration of the fuel does not initially change, since the fuel supply lines and the fuel filters are still initially filled with old fuel.

If by contrast a complete mixing of old and new fuel would also have taken place from the start in the fuel supply lines and in the fuel filter, the alcohol concentration of the upper dashed line $A_{T(E85)}$ would ensue. In practice, the alcohol concentration of the fuel after filling can thus only lie between these two dashed lines.

Based on this knowledge, with the method according to various embodiments, a first corridor 2 of possible lambda values for filling with a fuel type (E85) and a second corridor 4 of possible lambda values for filling with the other fuel type (E0) are established as a function of the volumes of the tank fuel before and after filling. The corridor 2 is limited by an upper threshold 6 and a lower threshold 8, which thus establish a range within which the alcohol concentration as well as the lambda values have to lie during filling with E85, provided no systems errors exist. Correspondingly, the upper and lower threshold 10 and/or 12 of the corridor 4 limit a range in which the alcohol concentration and/or the lambda values have to lie during filling with E0 fuel. The dashed line $A_{T(E0)}$ represents the calculated alcohol concentration of the tank fuel after filling with E0 fuel, provided the old and new fuel have mixed completely.

As can be seen in the diagram, the corridor 2 has a relatively large width after filling at time instant $T_1$. The thresholds 6, 8 are set increasingly closer as a function of the time and the fuel consumption—according to the pattern of the dashed lines $A_{T(E85)}$ and $A_{L(E85)}$. This expediently takes place in the form of an adaptation method, which constricts the thresholds 6 and 8 of the corridor 2 as a function of time and fuel consumption up to a narrow corridor for the time, in which "new" fuel is exclusively fed to the injection nozzles.

As indicated by the dashed lines $A_{L(E85)}$ of the diagram, the alcohol concentration changes and thus too the measured lambda value after the time instant $t_3$ gradually to higher values if the motor vehicle was filled with E85 fuel. On the basis of this change in the lambda values, the operating control device identifies that the motor vehicle was filled with E85 fuel (and not with E0 fuel). The operating control device then selects the corridor 2 as decisive, whereas the corridor 4 is excluded.

The corridors 2 and 4 are expediently established as percentages, based on the alcohol concentration before filling. This is established for instance with the aid of test series, but can however also take place computationally.

The corridors 2 and 4 are used for "plausibilization" of the measured lambda values after the filling. If the measured lambda values lie outside the corridors 2, 4, a system error must be present like for instance a malfunction in the injection valves, the fuel pump etc. If the measured lambda values nevertheless lie within at least one of the corridors 2, 4, these are admissible lambda values. System diagnoses, which use the measured lambda values as input variables, can thus also be operated immediately after the filling process. This concerns in particular a diagnosis of the fuel system, in which the components of the fuel system like for instance fuel pump, injection valves, etc., are monitored in terms of their functionality. The fuel system diagnosis thus does not need to be switched off.

With the described method, account is taken of the extent of changes to the measured lambda value not as a result of a change in the alcohol concentration but instead as a result of changes (tolerances) in components of the fuel system. To this end, the fact that the status of components of the fuel system does not normally change during a filling process is drawn upon. The change in the lambda value, defined on the one hand by a change in the alcohol content and on the hand by a change in the status of the components of the fuel system, can be illustrated as follows:

$$\Delta_{LAM} = \Delta_{BT} + \Delta_A$$

Here $\Delta_{LAM}$ means the difference between a measured lambda value for any alcohol concentration and the theoretical lambda value for alcohol-free fuel and $\Delta_{BT}$ and $\Delta_A$ are then the ageing-specific and/or alcohol-specific proportions of the difference $\Delta_{LAM}$.

This equation with the two unknowns $\Delta_{BT}$ and $\Delta_A$ can be triggered with values for an operating point prior to and an operating point after the filling, as follows:

$$\Delta_{Lam,before} = \Delta_{BT} + \Delta_{A,before}$$

$$\Delta_{Lam,after} = \Delta_{BT} + \Delta_{A,after}$$

by subtracting the second equation from the first equation, the following applies:

$$\Delta_{Lam,before} - \Delta_{Lam,after} = \Delta_{A,before} - \Delta_{A,after}$$

followed by $$\Delta_{A,after} = \Delta_{A,before} / (\Delta_{Lam,before} - \Delta_{Lam,after})$$

and $$\Delta_{BT} = \Delta_{Lam,after} - \Delta_{A,after}$$

Changes to the measured lambda values, which are due to the components of the fuel system ageing, can be determined in this way. The determined values $\Delta_{BT}$ allow the alcohol concentration in the tank fuel to be determined more precisely. The values $\Delta_{BT}$ are advantageously taken into account during the determination of the thresholds 6, 8 and 10, 12 of the corridors 2, 4.

What is claimed is:

1. A method for determining an alcohol concentration of fuel fed to combustion in a motor vehicle after filling a fuel tank of a fuel system with either a first fuel type of a first predetermined alcohol concentration or a second fuel type of a second predetermined alcohol concentration, the method comprising:
   prior to having determined whether the filled fuel type is the first fuel type or the second fuel type:
      establishing a first corridor of possible lambda values associated with filling the tank with the first fuel type, the first corridor being defined between an upper first corridor threshold and a lower first corridor threshold;
      establishing a second corridor of possible lambda values associated with filling the tank with the second fuel type, the second corridor being defined between an upper second corridor threshold and a lower second corridor threshold; and
      dynamically adapting at least one of the upper threshold and the lower threshold of each corridor as a function of time and fuel consumption such that an initially large width of at least one of the corridors becomes increasingly smaller;
   determining whether the filled fuel type is the first fuel type or the second fuel type, based on the dynamically adapted first and second corridors, changes to a lambda value measured by a sensor, an alcohol concentration of the fuel tank before filling, and volumes of the fuel tank before and after filling; and
   in response to determining whether the filled fuel type is the first fuel type or the second fuel type, considering only the corridor corresponding to the determined filled fuel, and ignoring the other corridor, for a subsequent evaluation of measured lambda values.

2. The method according to claim 1, further comprising identifying an error in the fuel system when measured lambda values do not lie in at least one of the first and second corridors.

3. The method according to claim 1, further comprising diagnosing, using measured lambda values as input variables, when the measured lambda values lie within at least one of the first and second corridors.

4. The method according to claim 1, further comprising establishing and taking into account certain changes to lambda values during the determining as a result of components in the fuel system ageing.

5. The method according to claim 4, wherein the establishing and taking into account certain changes to lambda values includes allowing specific changes to the lambda values according to $$\Delta_{Lam} = \Delta_{BT} + \Delta_A$$

for an operating point before and an operating point after the filling, where $\Delta_{Lam}$ is a difference between a measured lambda value and a lambda value for fuel of an alcohol concentration of 0% and $\Delta_{BT}$ and $\Delta_A$ are ageing and alcohol-specific proportions of the difference.

6. The method according to claim 4, wherein determined ageing-specific changes to the lambda values are taken into account when determining the thresholds of the first and second corridors.

7. The method according to claim 1, wherein the first fuel type is a fuel of an alcohol concentration of 85% and the second fuel type is a fuel of an alcohol concentration of 0%.

8. A method for determining an alcohol concentration of fuel fed to combustion in a motor vehicle, comprising:
   filling a fuel tank of a fuel system with either a first fuel type of a first alcohol concentration or a second fuel type of a second alcohol concentration;
   without knowledge of whether the filled fuel type is the first fuel type or the second fuel type:
      establishing a first corridor of possible lambda values associated with filling the tank with the first fuel type, the first corridor being defined between an upper first corridor threshold and a lower first corridor threshold;
      establishing a second corridor of possible lambda values associated with filling the tank with the second fuel type, the second corridor being defined between an upper second corridor threshold and a lower second corridor threshold;
      measuring changes to a lambda value by a lambda sensor after the filling; and
      dynamically adapting at least one of the upper threshold and the lower threshold of each corridor as a function of time and fuel consumption such that an initially large width of at least one of the corridors becomes increasingly smaller;
   evaluating the filled fuel based on the dynamically adapted first and second corridors, the measured changes to the lambda value, an alcohol concentration of the fuel tank before the filling, and volumes of the fuel tank before and after the filling.

9. The method according to claim 8, wherein only one of the first and second corridors is taken into account during an evaluation of lambda values, once the filled fuel type is identified.

10. The method according to claim 8, further comprising identifying an error in the fuel system when measured lambda values do not lie in at least one of the first and second corridors.

11. The method according to claim 8, further comprising diagnosing, using measured lambda values as input variables, when the measured lambda values lie within at least one of the first and second corridors.

12. The method according to claim 8, further comprising establishing and taking into account certain changes to lambda values during the evaluating as a result of components in the fuel system ageing.

13. The method according to claim 12, wherein the establishing and taking into account certain changes to lambda values includes allowing specific changes to the lambda values according to $$\Delta_{Lam} = \Delta_{BT} + \Delta_A$$

for an operating point before and an operating point after the filling, where $\Delta_{Lam}$ is a difference between a measured lambda value and a lambda value for fuel of an alcohol concentration of 0% and $\Delta_{BT}$ and $\Delta_A$ are ageing and alcohol-specific proportions of the difference.

14. The method according to claim 12, wherein determined ageing-specific changes to the lambda values are taken into account when determining the thresholds of the first and second corridors.

15. The method according to claim 8, wherein the first fuel type is a fuel of an alcohol concentration of 85% and the second fuel type is a fuel of an alcohol concentration of 0%.

* * * * *